A. G. SHARKEY.

CAR FOR ROLLER COASTERS.

APPLICATION FILED MAR. 18, 1911.

Reissued July 11, 1911. 13,271.

Witnesses:
Charles T. Green
F. Allen

Inventor
Albert G. Sharkey

COLUMBIA PLANOGRAPH CO., WASHINGTON, D. C.

UNITED STATES PATENT OFFICE.

ALBERT G. SHARKEY, OF NEW YORK, N. Y.

CAR FOR ROLLER-COASTERS.

13,271. Specification of Reissued Letters Patent. Reissued July 11, 1911.

Original No. 952,472, dated March 22, 1910, Serial No. 490,618. Application for reissue filed March 18, 1911. Serial No. 615,450.

*To all whom it may concern:*

Be it known that I, ALBERT G. SHARKEY, a citizen of the United States, residing in New York city, State of New York, have invented a new and useful Improvement in Cars for Roller-Coasters, of which the following is a specification.

This invention relates to a car of novel construction for an amusement device commonly known as "roller coasters," and has for its principal object to provide a car of this character adapted to be subjected to a variety of different motions as it travels down the slideway, and at the same time provide for the safety of the passengers.

A further object is to provide ball-bearings for the various engaging parts, whereby the friction is reduced to a minimum.

With these various objects in view, and also certain other objects as will appear hereinafter, my invention consists in the novel features of construction, combination and arrangement, all of which will be fully described hereinafter, and pointed out in the claims.

Figure 1:
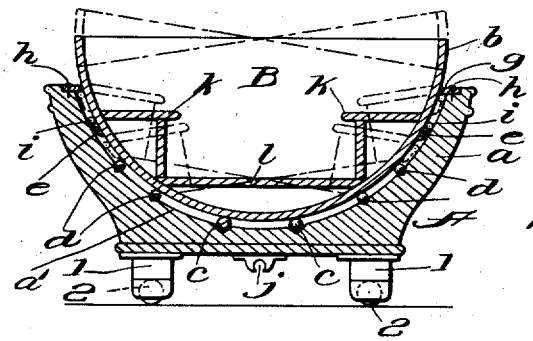
Figure 2:
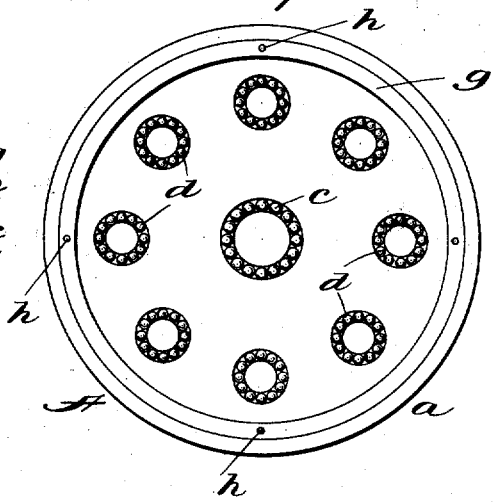
Figure 3:
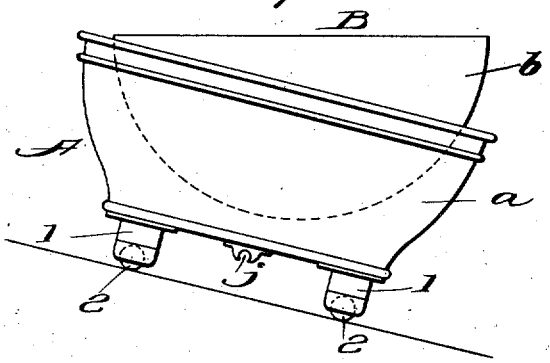

In the drawing forming part of this specification: Figure 1 is a vertical sectional view of my improved car. Fig. 2 is a top plan view of the outer member of the car. Fig. 3 is a side elevation of the car showing one position of the parts thereof as the car travels down an incline.

In the drawing A indicates a truck comprising a body "*a*" provided with legs 1 mounted on rolling supports preferably balls 2, but if desirable wheels or rollers may be used instead of the balls. The body "*a*" consists preferably of a shell which may be termed the outer shell which is provided with a hemispherical depression "*a'*."

B indicates a passenger carrier comprising the inner hemispherical shell "*b*" which is rotatably and oscillatively mounted within the depression "*a'*" in the outer shell "*a*" on anti-friction bearings preferably balls "*c*" and "*d*." A circumferential rib "*e*" is fastened upon the exterior of the inner shell "*b*," and connected to the upper end of the outer shell is an overlapping ring "*g*," secured by screws "*h*," the purpose of said ring being to limit the rocking motion of the inner shell, and anti-friction balls "*i*" are arranged between these two rings to reduce the friction of these parts during the movements of said shells. A cable grip "*j*," is arranged upon the bottom of the car to engage the cable for the purpose of being elevated up the starting point of the slideway. Seats K are arranged upon opposite sides of the inner shell of the car and said shell is also provided with a floor "*l*."

When the car is placed on the slideway at the starting point thereof and released, its own weight, and the added weight of the passengers, will cause the car to travel down the slideway, and if the slideway is constructed like the slideway set forth in my application for patent for "slideway for amusement device," filed July 23, 1909, File No. 509180, the car in its travel down the slideway will turn around and around, will move up and down, will travel from one side of the slideway to the other and the inner shell will turn and rock within the outer shell in accordance with the preponderance of weight.

I do not desire to limit myself to the precise details of construction and arrangement of the parts herein shown and described as it is obvious that variations may be made without departing from the spirit of the invention.

Having thus fully described my invention, what I claim as new and desire to secure by Letters Patent is:—

1. A coaster car having a flat bottom, rollers carried by said bottom, a hemispherical body carried by said bottom, a second hemispherical body arranged within the first, spaced from the first mentioned body and moving freely relative to the first mentioned body.

2. In a device of the kind described, a car comprising an outer shell provided with ball-bearing casters or supporting legs, and an inner shell arranged within the outer shell and adapted to turn and rock within said outer shell, said inner and outer shells being provided with means to limit the rocking motion of the inner shell.

3. In a device of the kind described, a car comprising an outer shell having ball bearing casters or supporting legs, said outer shell also having an inwardly projecting stop-ring, an inner shell having a stop-ring surrounding the same and ball-bearings arranged between the said inner shell and outer shell, and stop ring, as set forth.

4. In a device of the kind described, a car comprising the inner and outer shells, together with means for limiting the rocking movements of said inner shell, and ball-bearings arranged between said shells, for the purpose specified.

5. A coaster car consisting of a hemispherical body, rolling supports for said body, a second hemispherical body arranged within the first, the second body having a rotary and a rocking movement with respect to the first.

6. In a roller coaster, a car having a concave interior, and a hemispherical passenger receptacle loosely arranged within the car, and anti-friction balls spacing the passenger receptacle from the concave sides of the car.

7. In a coaster, a car having a concavo convex body, means for imparting a swaying and tilting movement to said body during its travel, and a hemispherical body arranged within the concavo convex body, and having free relative movement with respect thereto.

8. A car for amusement device, comprising a truck, and a passenger carrier, freely mounted on said truck to oscillate in any direction, and adapted to normally rest in a level position.

9. A car for amusement device comprising a truck and an oscillative and rotative passenger carrier freely mounted on said truck and adapted to normally rest in a level position.

10. A car for amusement device comprising a truck and an oscillative passenger carrier freely mounted on said truck and means for limiting the oscillating movement of the passenger carrier.

In testimony whereof I have signed my name to this specification in the presence of two subscribing witnesses.

ALBERT G. SHARKEY.

Witnesses:
NATHAN BARDACH,
M. C. FERRIER.

Copies of this patent may be obtained for five cents each, by addressing the "Commissioner of Patents. Washington, D. C."